(12) United States Patent
Narayanan et al.

(10) Patent No.: US 9,576,325 B2
(45) Date of Patent: Feb. 21, 2017

(54) RECOMMENDING ADDITIONAL USERS FOR AN EVENT USING A SOCIAL NETWORKING SYSTEM

(75) Inventors: Srinivas P. Narayanan, San Francisco, CA (US); Justin Alexander Shaffer, Menlo Park, CA (US); Daniel Jeng-Ping Hui, Palo Alto, CA (US); Ross David Bayer, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 389 days.

(21) Appl. No.: 13/544,197

(22) Filed: Jul. 9, 2012

(65) Prior Publication Data
US 2014/0012926 A1    Jan. 9, 2014

(51) Int. Cl.
*G06F 15/16* (2006.01)
*G06Q 50/00* (2012.01)
*G06Q 10/06* (2012.01)
*G06Q 10/10* (2012.01)

(52) U.S. Cl.
CPC .............. *G06Q 50/01* (2013.01); *G06Q 10/06* (2013.01); *G06Q 10/10* (2013.01)

(58) Field of Classification Search
CPC .... G06Q 10/10; G06Q 10/1095; G06Q 50/01; G06Q 10/06; G06F 15/16; G06F 17/30
See application file for complete search history.

(56) References Cited

U.S. PATENT DOCUMENTS

| 2005/0282174 | A1* | 12/2005 | Webb | G06F 19/20 435/6.11 |
| 2007/0192299 | A1* | 8/2007 | Zuckerberg | G06Q 10/10 |
| 2008/0098087 | A1* | 4/2008 | Lubeck | G06Q 10/00 709/218 |
| 2009/0049127 | A1* | 2/2009 | Juan | H04L 67/306 709/204 |
| 2009/0055236 | A1* | 2/2009 | O'Sullivan et al. | 705/8 |
| 2009/0182589 | A1* | 7/2009 | Kendall et al. | 705/5 |

(Continued)

FOREIGN PATENT DOCUMENTS

| CN | 101495991 A | 7/2009 |
| TW | 201015475 A1 | 4/2010 |

OTHER PUBLICATIONS

PCT International Search Report and Written Opinion, PCT Application No. PCT/US2013/047776, Oct. 14, 2013, twelve pages.

(Continued)

*Primary Examiner* — Ario Etienne
*Assistant Examiner* — Kidest Mendaye
(74) *Attorney, Agent, or Firm* — Fenwick & West LLP

(57) ABSTRACT

Social networking system users may create events where a group of other users invited to the event meet at a specified time and location. While an inviting user initially specifies the group of users to invite to the event, the social networking system suggests additional users to invite to the event. The social networking system suggests additional users based on a prediction that the users would attend the event if invited. Various factors may be used to make the prediction, such as an affinity between the inviting user and the other users, the availability of the other users at the time of the event and/or the proximity of the other users to the location of the event. Invitations to the suggested additional users may be automatically sent or sent to a set of the additional users selected by the inviting user.

23 Claims, 3 Drawing Sheets

(56) References Cited

U.S. PATENT DOCUMENTS

| | | | |
|---|---|---|---|
| 2010/0325205 A1* | 12/2010 | Murphy | G06Q 10/10 |
| | | | 709/204 |
| 2011/0184766 A1* | 7/2011 | Virdhagriswaran | G06Q 10/067 |
| | | | 705/4 |
| 2011/0252097 A1 | 10/2011 | Walker et al. | |
| 2012/0150581 A1 | 6/2012 | McPhail | |
| 2012/0166532 A1 | 6/2012 | Juan et al. | |
| 2012/0254419 A1* | 10/2012 | Gilzean et al. | 709/224 |
| 2013/0227011 A1* | 8/2013 | Sharma | G06Q 50/01 |
| | | | 709/204 |
| 2015/0106146 A1* | 4/2015 | Higaki | G06Q 10/1095 |
| | | | 705/7.19 |
| 2015/0170045 A1* | 6/2015 | Kirkham | G06Q 10/06 |
| | | | 706/11 |
| 2015/0192819 A1* | 7/2015 | Koo | G02F 1/133305 |
| | | | 349/158 |

OTHER PUBLICATIONS

Canadian Intellectual Property Office, Office Action, Canadian Patent Application No. 2,874,827, Jan. 15, 2015, two pages.
Taiwan Intellectual Property Office, First Office Action, Taiwanese Application No. 102124266, Jun. 22, 2016, twenty-one pages.

* cited by examiner

RECOMMENDING ADDITIONAL USERS FOR AN EVENT USING A SOCIAL NETWORKING SYSTEM

BACKGROUND

Embodiments of the present disclosure relate generally to social networking systems and, in particular, to recommending users for an event created using a social networking system.

Social networking systems provide a useful environment in which their users can connect to and communicate with other users. Different social networking systems provide various mechanisms allowing users to interact within their social networks. Some social networking systems also include tools and/or functionality allowing users to calendar events for coordinating activities with other users. In addition to providing event scheduling for users involved, calendaring tools or functionality of a social networking system also provide a socializing function of informing users of activities of users to whom they are connected.

When creating an event, a social networking system inviting users to an event, or "inviting user," identifies the additional users invited to the event. Often, this requires the inviting user to navigate through other users connected to the inviting user. This manual identification of users may make it difficult for the inviting user to comprehensively identify additional users for inviting to an event.

SUMMARY

A social networking system allows its users to facilitate personal interaction by creating events that specify a location, time, activity, and/or one or more people associated with the event. For example, when creating an event, a user may invite other users to a particular location at a particular time. Although a user may identify other users to invite when creating an event, the social networking system may also suggest additional users that can be invited to join the event. The social networking system may determine the additional users for this suggestion based on the likelihood that the additional users will accept an invitation to an event and/or the likelihood that the inviting user will act on the suggestion and invite the suggested additional users. In making this determination, the social networking system may use a variety of factors, such as the location and availability of the suggested additional users in view of the time and location identified by the event. The social networking system may also use other factors, such as the affinity between the inviting user and the suggested additional users, the frequency that the suggested additional users join events, the history of the additional users attending events that the suggesting user also attended, or other suitable factors in making the determination.

In one embodiment, the social networking system receives information about an event from an inviting user of a social networking system. The received invitation includes a location and a time and identifies one or more users of the social networking system to attend the event. The social networking system accesses user profiles of one or more users that are connected to the inviting user and are not already attending the event and identifies a set of candidate users. In one embodiment, the location and time from the information about the event are compared to the user profiles of the users connected to the inviting user and not identified by the invitation as a mechanism to select a subset of the users not attending the event when identifying the set. For example, the set may include users within a predetermined distance of the event location identified by the invitation and at the identified time. As another example, the set includes users available at the time identified by the invitation and at a location within a predetermined distance of the location identified by the invitation.

One or more users may be selected from the set of candidate users based on a prediction of whether a suggestion to invite a candidate user would lead to the invited candidate user joining the event. In one embodiment, the affinity between the inviting user and a candidate user is used to predict whether a candidate user joins the event. A high affinity between the inviting user and a candidate user in the set indicates that the candidate user is likely to attend an event involving the inviting user. Other factors may be used in predicting whether a candidate user would join the event. For example, the location and/or availability of the candidate user at the time the event is scheduled to occur, and a history of a candidate user and the inviting user attending the same events provides an indication of whether the user is likely to accept the invitation to the event. Alternatively, the location and availability of social networking system users connected to the inviting user and not associated with the event is used as a filter to identify the set of candidate users before the predictions are made. The inviting user is then notified of the selected one or more candidate users, allowing the inviting user to invite the selected one or more candidate users to the event. Alternatively, the social networking system sends invitations to the selected one or more candidate users.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system allows its users to create events specifying a location, time, activity, and/or one or more people associated with the event to allow the users to interact in person. For example, a social networking system user creates an event by inviting other users to a particular location at a particular time. As used herein, "event" may also refer to an informal plan that specifies a subset of information included in an event. For example, an event may identify a location and a time or a time and a group of users. Hence, an event may specify one or more of a time, a location, an activity and/or one or more users.

Although a user may identify other users to invite when creating an event, the social networking system may also suggest additional users to invite to the event. The social networking system may determine the additional users for this suggestion based on the likelihood that the additional users will accept an invitation to the event and/or the likelihood that the inviting user will act on the suggestion and invite the suggested additional users. A variety of factors, such as the location and availability of the suggested additional users in view of the time and location identified by the event, may be used in making these determinations. Additional examples of factors for this determination include the affinity between the inviting user and the suggested additional users, the frequency that the suggested additional users join events, the history of the additional users attending events that the suggesting user also attended, or other suitable factors.

Figure 1:
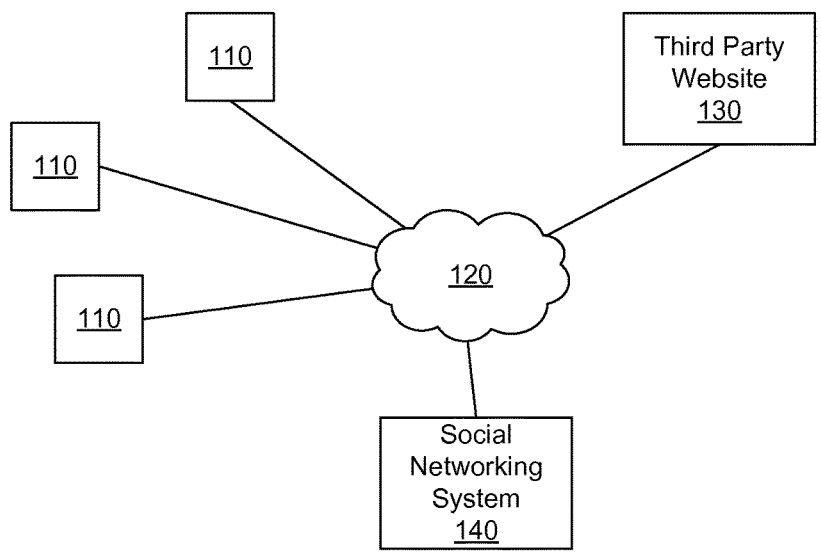
FIG. 1 is a block diagram of a system environment for recommending users of a social networking system for an event, in accordance with an embodiment of the invention.

FIG. 1 is a high level block diagram illustrating a system environment 100 suitable for operation of the social networking system 140. The system environment 100 includes one or more client devices 110, a network 120, one or more third-party websites 130, and the social networking system 140. In alternative configurations, different and/or additional modules can be included in the system. While FIG. 1 illustrates a social networking system 140, the embodiments and functionality described herein may be also be used with other types of online systems.

The client devices 110 comprise one or more computing devices capable of receiving user input as well as and transmitting and/or receiving data via the network 120. Examples of client devices 100 include: laptop computers, smartphones, personal digital assistants (PDAs), or any other device including computing functionality and data communication capabilities. The client devices 110 are configured to communicate via the network 120, which may comprise any combination of local area and/or wide area networks, using both wired and wireless communication systems. One or more third party websites 130 may be coupled to the network 120 for communicating with the social networking system 140 and/or with a client device 110.

System Architecture of a Social Networking System

Figure 2:
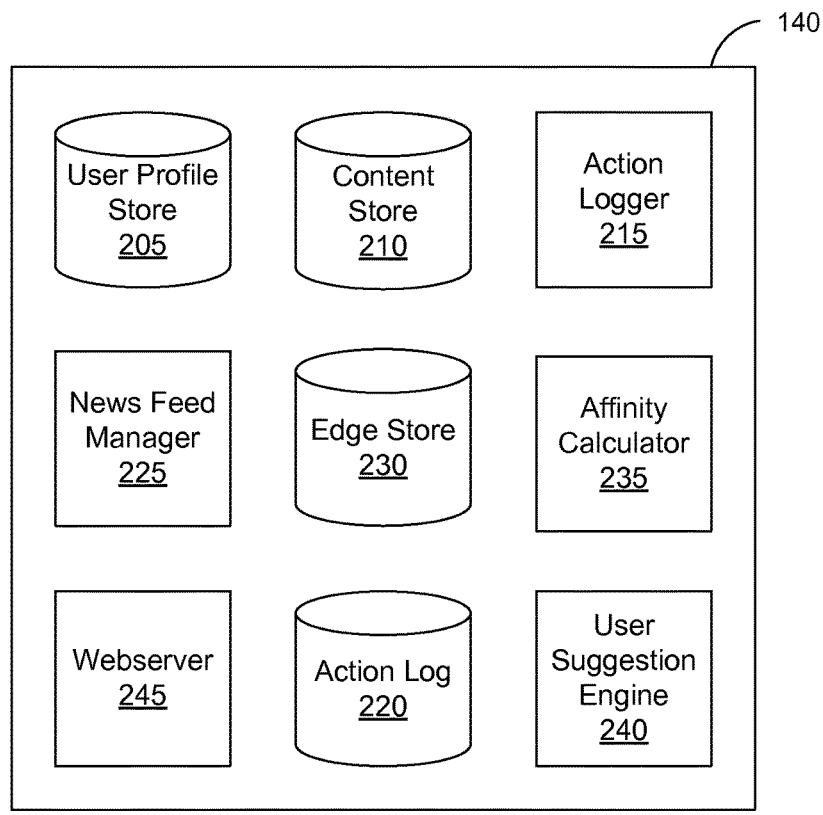
FIG. 2 is a block diagram of a system architecture for a social networking system, in accordance with an embodiment of the invention.

FIG. 2 is an example block diagram of a system architecture of the social networking system 140. The social networking system 140 includes a user profile store 205, a content store 210, an action logger 215, an action log 220, a newsfeed manager 225, an edge store 230, an affinity calculator 235, a user suggestion engine 240, and a web server 245. In other embodiments, the social networking system 140 may include additional, fewer, or different modules for various applications.

Each user of the social networking system 140 is associated with a user profile, which is stored in the user profile store 205. A user profile includes declarative information about the user that was explicitly shared by the user, and may also include profile information inferred by the social networking system 140. In one embodiment, a user profile includes multiple data fields, each data field describing one or more attributes of the corresponding user of the social networking system 140. The user profile information stored in user profile store 205 describes the users of the social networking system 140, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

The content store 210 stores content items, or objects, associated with a user profile, such as images, videos and audio files. Content items from the content store 210 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social networking system 140 by displaying content related to users, objects, activities, or functionalities of the social networking system 140. Examples of social networking content items include events, pages associated with events, groups, pages (e.g., pages representing an organization, pages representing a commercial entity), suggested connections, suggestions to perform other actions, pictures, video data, audio data, status messages or links posted by users to the social networking system or any other content provided by or accessible via the social networking system.

When an inviting user creates an event using the social networking system 140, an event object is created and stored in the content store 310. The event object includes data received from the inviting user that describes the event. Examples of data included in an event object include a name or title of the event, a location for the event, a time for the event, one or more users associated with the event. The users associated with the event may be users invited to the event, users attending the event, users who have otherwise responded to an invitation to the event or a combination of the preceding. Invitations to the event are sent to users invited to the event, causing edges to be created from the event object to user profiles of the invited users. These edges are stored in the edge store 230, further described below, and describe a connection between the event, as represented by the event object, and the users invited to the event.

The action logger 215 receives communications about user actions on and/or off the social networking system 140, populating the action log 220 with information about user actions. Examples of actions include: adding a connection to another user, sending a message to another user, uploading an image, reading a message from another user, viewing content associated with another user, attending an event posted by another user, inviting one or more users to an event, among others. In addition, a number of actions described in connection with other objects are directed at particular users, and are associated with those users as well. These actions are stored in the action log 220. The action logger 215 may receive data describing actions performed by a user on systems external to the social networking system 140, such as third-party website 130, and store these actions to the action log 220 as well.

Hence, the action log 230 may be used by the social networking system 100 to track user actions on the social networking system 100, as well as external website that communicate information to the social networking system 100. Users may interact with various objects on the social networking system 140, including commenting on posts, sharing links, checking-in to physical locations via a client device 110, accessing content items, creating an event, accepting an invitation to an event, commenting on an event or other interactions. Information describing these actions is stored in the action log 220. Additional examples of interactions with objects on the social networking system 140 included in the action log 220 include commenting on a photo album, communications between users, becoming a fan of a musician, adding an event to a calendar, joining a group, becoming a fan of a brand page, authorizing an application, using an application and engaging in a transaction. Additionally, the action log 220 records a user's interactions with advertisements on the social networking system 140 as well as other applications operating on the social networking system 140.

The action log 220 may also store user actions taken on external websites. For example, the action logger 215 receives data describing a user's interaction with a third-party website 130. Examples of actions where a user interacts with a third-party website 130 include a user expressing an interest in a third-party website 130 or another entity, a user posting a comment to the social networking system 140 that discusses a third-party website 130, or a web page within the third-party website 130, a user posting to the social networking system 140 a Uniform Resource Locator (URL) or other identifier associated with a third-party website 130, a user attending an event associated with a third-party website 130 or any other action by a user that is related to a third-party website 130. For example, an e-commerce website that primarily sells sporting equipment at bargain prices may recognize a user of a social networking system 130 through social plug-ins that enable the e-commerce website to identify the user of the social networking system 130. Because users of the social networking system 130 are uniquely identifiable, e-commerce websites, such as this sporting equipment retailer, may use the information about these users as they visit their websites. The action log 220 records data about these users, including webpage viewing histories, advertisements that were engaged, purchases made, and other patterns from shopping and buying.

A news feed manager 225 selectively provides content to users of a social networking system 140 and records the consumption of content by users. In one embodiment, the news feed manager 225 generates stories for a user describing actions taken by other users of the social networking system 140 to whom the user is connected. In one example, the newsfeed generated by the news feed manager 225 for a user includes comments made by other users to whom the user is connected. In another example, the newsfeed generated includes content posted to the social network system 140 by other users of the social networking system to whom the user is connected or other actions taken by other users to whom the user is connected. Additionally, a newsfeed may include a notification of an event or an invitation to an event, allowing a user to join the event by interacting with the story in the newsfeed. New news feed stories generated for a user by the news feed manager may be ranked and stored by the social networking system 140. The news feed manager 225 may communicate with client devices 110 through the network 120 to provide content to users of the social networking system 140.

In one embodiment, an edge store 230 stores the information describing connections between users and other objects on the social networking system 140 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system. The edge store 230 stores edge objects that include information about the edge, such as affinity scores for objects, interests, and other users. Multiple interactions between a user and a specific object may be stored in one edge object in the edge store 230, in one embodiment. In some embodiments, connections between users may be stored in the user profile store 210, or the user profile store 210 may access the edge store 230 to determine connections between users.

In some embodiments, an event may indicate a future activity articulated by an inviting user of the social networking system 140, such an event may be referred to as a "plan." A plan may include one or more of: an identification of the inviting user or another user performing the identified activity, a time during which the activity will be performed, a location where the activity will be performed and one or more other users with whom the inviting user intends to perform the activity. A plan is stored in the edge store 230 as edges between nodes, such as user profiles and/or other user profiles or objects. Thus, a plan connects disparate objects in stored by the social networking system 140 by forming edges between the objects. In one embodiment, a plan comprises one or more edges connecting two or more objects stored in the content store 210 and/or the user profile store 205.

The social networking system 140 also determines a user's affinity for other objects or users in the social networking system 140. In one embodiment, the affinity calculator 235 uses edges between the user and other objects or other users are used to determine an affinity score for the different objects and/or users to which the user is connected. Actions performed by the user and stored in the action log 220 are also used to determine the user's affinity score for an object or for another user.

The affinity of a user for other users may be used to identify users for inviting to an event. For example, when an inviting user creates an event, the inviting user's affinity scores for other users connected to the inviting user are retrieved, providing an indication of the relationship between the inviting user and the other users. The affinity score between the inviting user and another user provides an indication of the other user's likelihood to attend an event the inviting user also attends and/or the likelihood that the inviting user would want to invite the other user to an event. In one embodiment, responsive to the inviting user creating an event object, the affinity calculator 235 identifies users connected to the inviting user from the edge store 230 and determines an affinity score between the inviting user and the various users connected to the inviting user. Various factors may be used to calculate an affinity score, such as actions performed by the inviting user and the other user, common or related interests between the inviting user and the other user, additional users connected to both the inviting user and the other user or other suitable information. Example embodiments of computing affinity scores are described in "Contextually Relevant Affinity Prediction in a Social Networking System," U.S. patent application Ser. No. 12/978,265, filed on Dec. 23, 2010, which is hereby incorporated by reference in its entirety.

The user suggestion engine 240 identifies additional social networking system users for inviting to an event created by an inviting user. In one embodiment, the user suggestion engine 240 accesses the user profile store 205 and the edge store 230 to identify candidate users who are connected to the inviting user that are not already invited to the event. A variety of factors may be used to select a set of candidate users. For example, the set of candidate users includes users connected to the inviting user that are not invited to the event but are within a specified distance of the event's location or users connected to the inviting user within a specified distance of the event's location and available at the time of the event. Hence, the user suggestion engine 240 may filter the users connected to the inviting user and not invited to the event based on their proximity to the event and/or their availability at the time of the event to select the set of candidate users. In other embodiments, the user suggestion engine 240 may use other attributes of the users connected to the inviting user and the event to select the set of candidate users.

The user suggestion engine 240 also uses affinity scores, from the affinity calculator 235, between the inviting user and various candidate users, as well as other factors to determine the probability that different candidate users would join the event if notified of it. For example, the user suggestion engine 240 accesses the user profile store 205 to determine the geographic location of a candidate user or to determine the availability of a candidate user during the time of the event. To identify candidate users most likely to attend the event, the user suggestion engine 240 may account for the distance between a candidate user and the event's location in addition to affinity score, so candidate users within a threshold distance of the event's location are selected.

Hence, the probability of a candidate user joining an event may be based on various factors, such as the availability of candidate users at the time of the event, the proximity of candidate users to the event location, the affinity scores between candidate users and the inviting user as well as other suitable factors. The user suggestion engine 240 may use additional information from the user profile store 205, the action log 220, and/or the edge store 230 in determining the probability that a candidate user will accept an invitation to an event. For example, the user suggestion engine 240 determines shared interests between the inviting user and a candidate user based on information in the user profiles for the respective users and/or actions taken by the users. The user suggestion engine 240 may determine that a candidate user with a number of types of interests in common with the inviting user is likely to attend an event that the inviting user created or is attending. As another example, the user suggestion engine 240 estimates a candidate user's probability of accepting an invitation to the event based on prior actions by a candidate user relating to events with similar attributes. For example, a candidate user that has joined events created by the inviting user, has joined events that the inviting user has also attended, has joined events at the same location as the event and/or has joined events with similar themes may be determined to have a higher probability of accepting an invitation to the event.

In another embodiment, user suggestion engine 240 determines the probability that the inviting user would send an invitation to a candidate user if the candidate user was suggested to the inviting user. This probability may also be based on the inviting user's affinity for the candidate user as well as other factors, as described above. Alternatively, the user suggestion engine 240 determines the probability that the inviting user would send an invitation to a candidate user if suggested and the probability that the candidate user would join the event upon receiving an invitation; for example, the user suggestion engine 240 identifies candidate users based on the product of the probability that the inviting user would send an invitation to the candidate user and the probability that the candidate user would accept the invitation.

Other data may be used by the user suggestion engine 240 to determine the probability that candidate users would attend an event. Additional examples of data include a level of interaction between the inviting user and a candidate user, a number of users connected to both the inviting user and to a candidate user, a similarity of interests or other user profile information of the inviting user and the candidate user, a degree of separation between the inviting user and a candidate user or other information indicating an affinity between the inviting user and a candidate user.

In some embodiments, the user suggestion engine 240 associates a social value with each candidate user representing the social influence of each candidate user. This "social influence" may represent the likelihood that additional users will join an event that a candidate user joins. Hence, the social value allows identification of users whose attendance to an event increases the likelihood that additional users attend the event. For a candidate user, this value may be based on a number of factors including: the number of connections to other users or objects associated with the candidate user, the type of connections the candidate user has to other users or objects, a frequency that other users accept invitations from the candidate user, number of interactions between other users and the candidate user, as well as other factors. Using the social values associated with different candidate users, the user suggestion engine 240 determines an expected value for different candidate users based on their social value and the probability that they accept an invitation to the event. Candidate users having the highest expected values or having expected values equaling or exceeding a threshold value are suggested by the user suggestion engine 240 to the inviting user.

The web server 245 links the social networking system 140 via the network 120 to the one or more client devices 110, as well as to the one or more third party websites 130. The web server 245 serves web pages, as well as other web-related content, such as Java, Flash, XML and so forth. The web server 245 may provide the functionality of receiving and routing messages between the social networking system 140 and the client device 110, for example, instant messages, queued messages (e.g., email), text and SMS (short message service) messages, or messages sent using any other suitable messaging technique. A user may send a request to the web server 245 to upload information, for example, images or videos that are stored in the content store 210. Additionally, the web server 245 may provide API functionality to send data directly to native client device operating systems, such as iOS®, ANDROID™, webOS® or RIM.

Selecting Additional Users for Invitation to an Event

Figure 3:
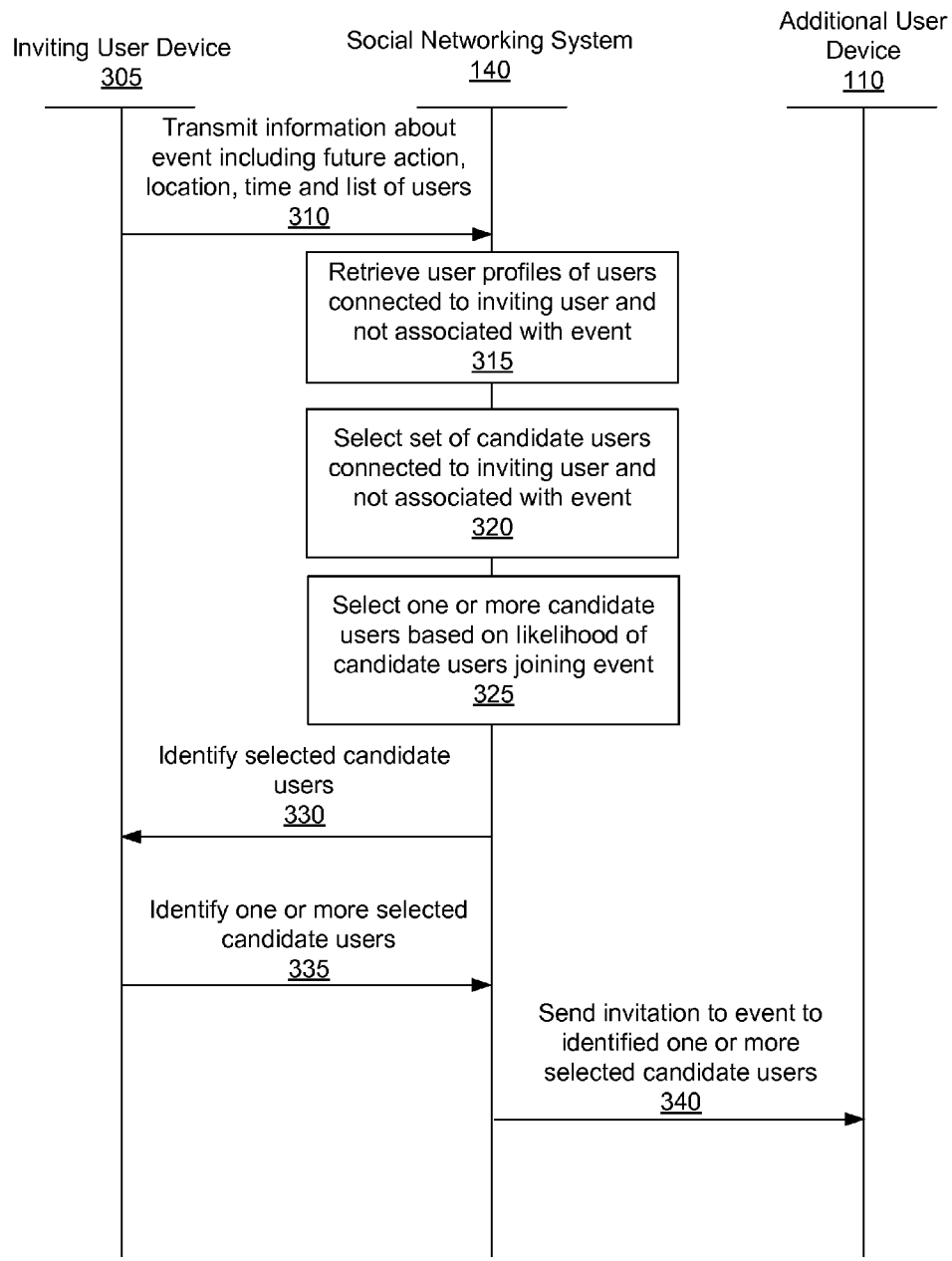
FIG. 3 is an interaction diagram of a method for recommending additional social networking system users to invite to an event, in accordance with an embodiment of the invention.

FIG. 3 illustrates a method 300 for recommending additional social networking system users to invite to an event. In the example of FIG. 3, an inviting user uses an inviting user device 305 to transmit 310 information about an event to the social networking system 140. The information about the event includes one or more of a location, a time, and one or more users of the social networking system who are associated with the event. Based on the information about the event, the social networking system 140 generates an event object and stores the event object in the content store 210.

Based on data in the user profile store 205 and the edge store 230, the social networking system 140 retrieves 315 user profiles of social networking system users that are connected to the inviting user but are not associated with the event. For example, the social networking system 140 retrieves 315 user profiles of users connected to the inviting user but not identified by the event information. From the retrieved user profiles, the user suggestion engine 240 selects 320 a set of candidate users who are connected to the inviting user but not associated with the event.

The user suggestion engine 240 may use a variety of factors to select 320 the set of candidate users. For example, the set of candidate users includes users connected to the inviting user that are not invited to the event but are within a specified distance of the event's location or users connected to the inviting user within a specified distance of the event's location and available at the time of the event. Hence, the user suggestion engine 240 may filter the users connected to the inviting user and not invited to the event based on their proximity to the event and/or their availability at the time of the event to select 320 the set of candidate users. In other embodiments, the user suggestion engine 240 may use other attributes of the users connected to the inviting user and the event to select 320 the set of candidate users.

From the set of candidate users, the user suggestion engine 240 selects 325 one or more candidate users based on a prediction of whether each of the candidate users would join the event if notified of the event. In one embodiment, the prediction is based on the probability that a candidate user would join the event if notified of it (i.e., the likelihood a candidate user would accept an invitation to the event). As described above in conjunction with FIG. 2, the user suggestion engine 240 may use a variety of factors to determine the probability that a candidate user would join an event. For example, the user suggestion engine 240 bases the prediction of a candidate user joining the event on one or more of the candidate user's affinity score for the inviting user, the candidate user's location relative to the event's location and the candidate user's availability at the time of the event. The user suggestion engine 240 may select 325 candidate users having at least a threshold probability, or likelihood, of attending the event if invited to the event.

In another embodiment, the prediction used by the user suggestion engine 240 is based on the likelihood that the inviting user would send an invitation to a candidate user if suggested by the social networking system 140 to send an invitation. This likelihood may also be based on the inviting user's affinity for the candidate user as well as other factors. Alternatively, the prediction may be based on both the probability that the inviting user would send an invitation to a candidate user if suggested and the probability that the candidate user would join the event upon receiving an invitation; for example, the prediction for a candidate user is the product of the probability that the inviting user would send an invitation to the candidate user and the probability that the candidate user would accept the invitation.

However, in various embodiments, the user suggestion engine 240 may base the prediction of whether a candidate user would join an event on different data. Additional examples of data include a level of interaction between the inviting user and a candidate user, a number of users connected to both the inviting user and to a candidate user, a similarity of interests or other user profile information of the inviting user and the candidate user, a degree of separation between the inviting user and a candidate user or other information indicating an affinity between the inviting user and a candidate user. As another example, the user suggestion engine 240 determines an expected value for the candidate users based on their social value and probability of attending the event, as described above in conjunction with FIG. 2, and uses the expected value to select 325 the one or more candidate users.

The social networking system 140 identifies 330 the one or more selected candidate users to the inviting user, allowing the inviting user to determine whether to invite one or more of the selected candidate users to the event. Responsive to the inviting user identifying 335 one or more of the selected candidate users to invite to the event, the social networking system 140 sends 340 an invitation to the selected candidate users identified by the inviting user. This allows the inviting user to control users receiving invitations to the event while considering the suggested additional users identified by the social networking system 140. In an alternative embodiment, the social networking system 140 may automatically invite the selected candidate users; for example, the inviting user may store data in its corresponding user profile authorizing the social networking system 140 to invite additional users to the event on behalf of the inviting user.

Example User Interface

Figure 4A:
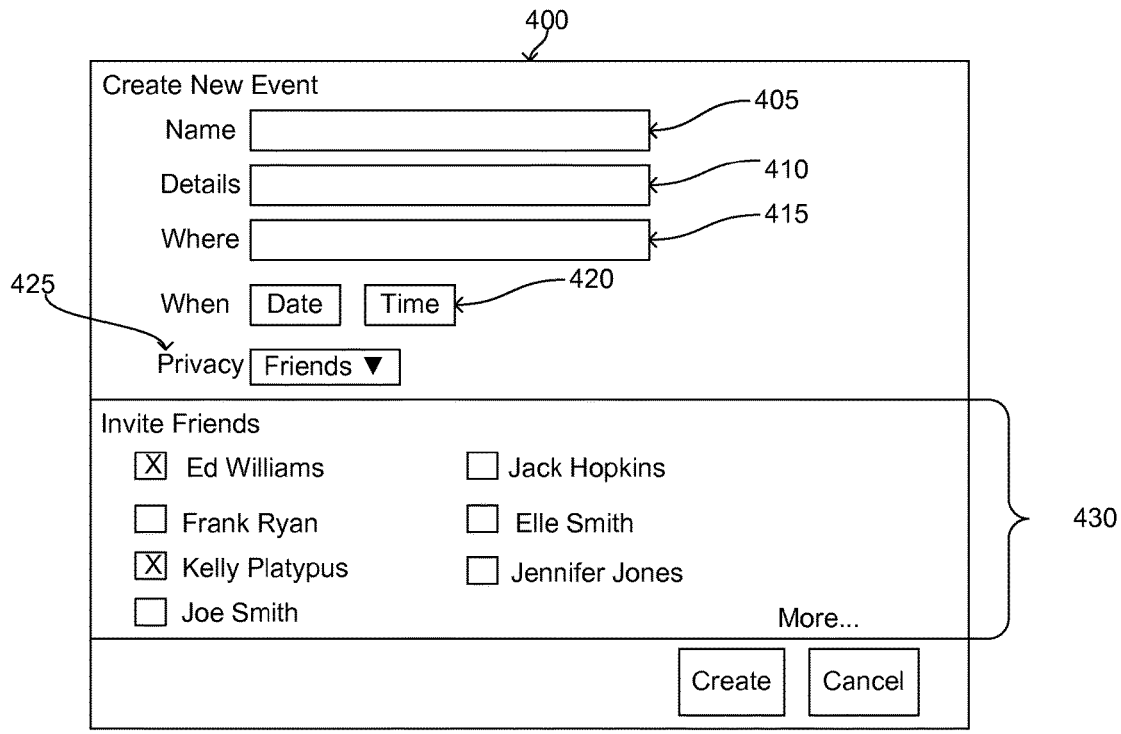
FIG. 4A is an example user interface for creating an event using a social networking system, in accordance with an embodiment of the invention.
Figure 4B:
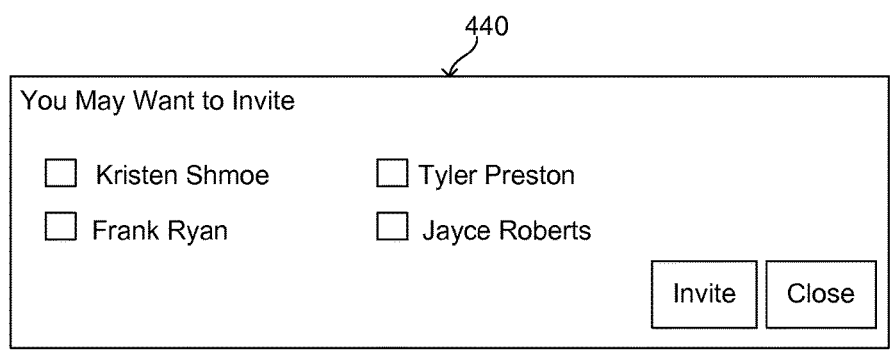
FIG. 4B is an example user interface for suggesting additional social networking system users to invite to an event, in accordance with an embodiment of the invention.

FIGS. 4A and 4B are examples user interfaces for creating an event and for suggesting additional users to invite to the event, respectively. The example event creation interface 400 of FIG. 4A includes a name field 405, a detail field 410, a location field 415 and a time field 420, allowing a user to specify an event name, a description or other information about the event, an event location and an event time, respectively. In the example of FIG. 4A, the event creation interface 400 also includes a privacy selector 425 allowing an inviting user to specify a group of social networking system users able to access the event information or a group of social networking system users to whom invitations to the event are sent.

The event creation interface 400 also includes a user selector 430 for the inviting user to identify other social networking system users to receive an invitation to the event. In one embodiment, the user selector 430 identifies social networking system users connected to the inviting user, allowing the inviting user to quickly identify and select additional users to be invited to the event. In some embodiments, the user selector 430 may also allow the inviting user to search for additional social networking system users.

FIG. 4B illustrates an example user suggestion interface 440 identifying suggestions of users to be invited to the event in addition to the users originally identified by the inviting user. The example user suggestion interface 440 may be displayed during the processor of creating the event, or could be displayed at a later time as a story in the inviting user's newsfeed, a notification sent to the inviting user, an action recommended for the inviting user or any other suitable distribution mechanism. As described above in conjunction with FIGS. 2 and 3, the user suggestions provided by the user suggestion interface 440 are users that the social networking system 140 determines are likely to attend the event. The social networking system 140 transmits an invitation to the event to suggested users selected by the inviting user via the user suggestion interface 440. Hence, the user suggestion interface 440 allows an inviting user to more readily invite additional users, who are likely to attend, an event.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving information about an event from an inviting user of a social networking system, the information including one or more of a location, a time, and one or more users of the social networking system who are associated with the event;
accessing user profiles of social networking system users connected to the inviting user and not already associated with the event;
selecting a set of candidate users from the social networking system users connected to the inviting user and not already associated with the event;
for each candidate user, generating a prediction of whether a suggestion to the inviting user to invite a candidate user to the event would lead to the candidate user joining the event based on both (1) an affinity for the inviting user by the candidate user and (2) a history of the candidate user attending events that the inviting user attended, the affinity computed based on scores for edges stored in the social networking system indicating connections between the user and other objects or other users, and based on actions performed by the inviting user in the social networking system with the candidate user;
selecting one or more candidate users from the set based on the prediction by:
assigning a social value to each candidate user from the set;
determining a probability that each candidate user from the set will join the event based on the prediction;
determining an expected value for each candidate user from the set, wherein the expected value of a candidate user is determined based on the candidate user's social value and a probability that the candidate user will join the event;
selecting one or more candidate users having highest expected values; and
sending a suggestion to the inviting user to send an invitation for the event to the selected one or more candidate users.

2. The method of claim 1, wherein selecting the set of candidate users from the social networking system users connected to the inviting user and not already associated with the event comprises:
selecting users connected to the inviting user and not identified by the information about the event having a location in their user profiles within a specified distance of the location included in the information about the event.

3. The method of claim 1, wherein selecting a set of candidate users from the social networking system users connected to the inviting user and not already associated with the event comprises:
selecting users having a location in their user profiles within a specified distance of the location included in the information about the event and an availability at the time included in the information about the event.

4. The method of claim 1, wherein selecting one or more candidate users from the set based on the prediction of whether the suggestion to invite each of the candidate users would lead to the candidate user joining the event comprises:
determining likelihood values indicating whether candidate users would join the event further based on an affinity for the inviting user by a candidate user and a history of the candidate user attending events that the inviting user attended; and
selecting one or more candidate users having highest likelihood value of joining the event.

5. The method of claim 1, wherein selecting one or more candidate users from the set based on the prediction of whether the suggestion to invite each of the candidate users would lead to the candidate user joining the event comprises:
  determining likelihood values indicating whether candidate users would join the event further based on the affinity for the inviting user by a candidate user and a history of the user from the subset attending events that the inviting user attended; and
  selecting one or more candidate users having a likelihood value of joining the event equaling or exceeding a threshold likelihood value.

6. The method of claim 1, wherein selecting one or more candidate users from the set based on the prediction of whether the suggestion to invite each of the candidate users would lead to the candidate user joining the event comprises:
  determining likelihood values indicating whether candidate users would join the event further based on an affinity for the inviting user by a candidate user, a history of the candidate user attending events that the inviting user attended and the candidate user's location at the time included in the information about the event; and
  selecting one or more candidate users having a likelihood value of joining the event equaling or exceeding a threshold likelihood value.

7. The method of claim 6, wherein the candidate user's location at the time included in the information about the event is determined from one or more responses to additional events associated with the location identified by the invitation received from the candidate user.

8. The method of claim 1, further comprising:
  receiving a response from the inviting user identifying a candidate user to receive an invitation, sending a notification of the event to an electronic device associated with the identified user.

9. The method of claim 1, wherein sending the suggestion to the inviting user to send the invitation for the event to the selected one or more candidate users comprises:
  including a story identifying the selected one or more candidate users in a news feed sent to an electronic device associated with the inviting user.

10. The method of claim 1, wherein sending the suggestion to the inviting user to send the invitation for the event to the selected one or more candidate users comprises:
  sending a notification identifying the selected one or more candidate users to an electronic device associated with the inviting user.

11. The method of claim 1, wherein the one or more users of the social networking system who are associated with the event comprise one or more users of the social networking system invited to the event.

12. The method of claim 1, wherein the one or more users of the social networking system who are associated with the event comprise one or more users of the social networking system attending the event.

13. The method of claim 1, wherein the prediction of whether the suggestion to invite a candidate user would lead to the candidate user joining the event is further based on the probability of the inviting user inviting the candidate user in response to the inviting user being presented with the suggestion.

14. A method comprising:
  receiving information about an event from an inviting user of a social networking system, the information including one or more of a location, a time, and one or more users of the social networking system who are associated with the event;
  accessing user profiles of social networking system users connected to the inviting user and not already associated with the event;
  selecting a set of candidate users from the social networking system users connected to the inviting user and not already associated with the event;
  determining a likelihood value that each of the candidate users from the set would join the event if invited, the likelihood value of a candidate user joining the event based on both (1) an affinity for the inviting user by the candidate user and (2) a history of each of the candidate users attending events that the inviting user attended, the affinity computed based on scores for edges stored in the social networking system indicating connections between the user and other objects or other users, and based on actions performed by the inviting user in the social networking system with the candidate user;
  selecting one or more candidate users from the set based on a the determined likelihood values by:
  assigning a social value to each candidate user from the set;
  determining a probability that each candidate user from the set will join the event based on the determined likelihood values;
  determining an expected value for each candidate user from the set, wherein the expected value of a candidate user is determined based on the candidate user's social value and a probability that the candidate user will join the event;
  selecting one or more candidate users having highest expected values; and
  sending a suggestion to the inviting user to send an invitation for the event to the selected one or more candidate users.

15. The method of claim 14, further comprising:
  sending to the inviting user a confirmation that the invitation for the event was sent to the selected one or more candidate users.

16. The method of claim 14, wherein selecting the set of candidate users from the social networking system users connected to the inviting user and not already associated with the event comprises:
  selecting users connected to the inviting user and not identified by the information about the event having a location in their user profiles within a specified distance of the location included in the information about the event.

17. The method of claim 14, wherein selecting a set of candidate users from the social networking system users connected to the inviting user and not already associated with the event comprises:
  selecting users having a location in their user profiles within a specified distance of the location included in the information about the event and an availability at the time included in the information about the event.

18. The method of claim 14, wherein selecting one or more candidate users from the set based on the determined likelihood values comprises:
  selecting one or more candidate users having highest likelihoods of joining the event.

19. The method of claim 14, wherein selecting one or more candidate users from the set based on the determined likelihoods comprises:

selecting one or more candidate users having a likelihood value of joining the event equaling or exceeding a threshold likelihood value.

20. The method of claim 14, wherein selecting one or more candidate users from the set based on the determined likelihood values comprises: selecting one or more candidate users having highest expected values.

21. The method of claim 14, wherein sending the suggestion to the inviting user to send an invitation for the event to the selected one or more candidate users comprises:
including a story identifying the selected one or more candidate users in a news feed sent to an electronic device associated with the inviting user.

22. The method of claim 14, wherein the one or more users of the social networking system who are associated with the event comprise one or more users of the social networking system invited to the event.

23. The method of claim 14, wherein determining the likelihood value that each of the candidate users from the set would join the event if invited is further based on the probability of the inviting user inviting the candidate user in response to the inviting user being presented with the suggestion.

\* \* \* \* \*